W. H. ALLEN.
DEMOUNTABLE CUSHION TIRE.
APPLICATION FILED FEB. 2, 1914.
1,178,202.
Patented Apr. 4, 1916.
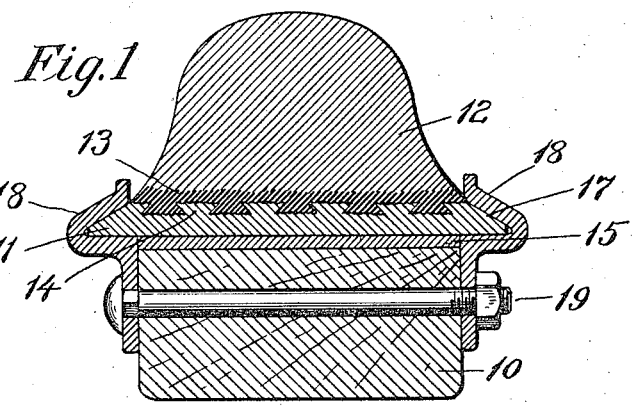
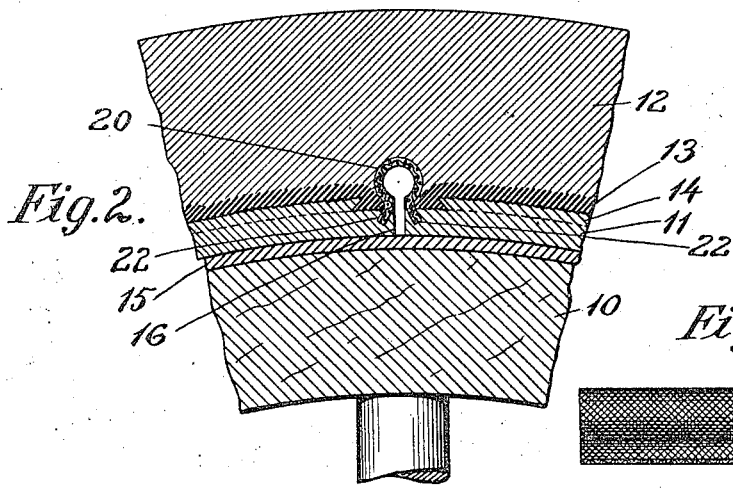
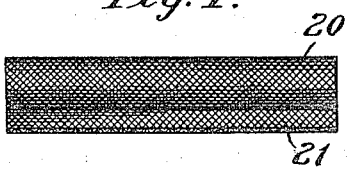
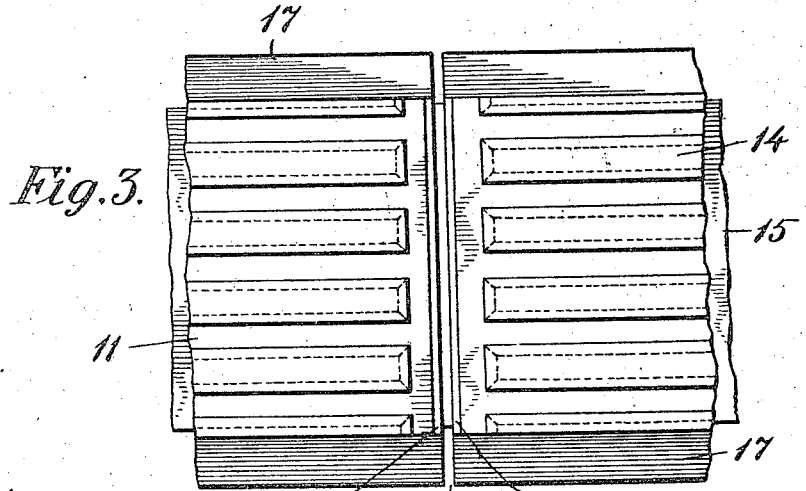
Witnesses:
Cora Williams
C. B. Mitchell
Inventor
W. H. Allen,
By his Attorney
Robert M. Pierson

UNITED STATES PATENT OFFICE.

WALTER H. ALLEN, OF AKRON, OHIO, ASSIGNOR TO THE B. F. GOODRICH COMPANY, OF NEW YORK, N. Y., A CORPORATION OF NEW YORK.

DEMOUNTABLE CUSHION-TIRE.

1,178,202.  Specification of Letters Patent.  Patented Apr. 4, 1916.

Application filed February 2, 1914. Serial No. 816,049.

*To all whom it may concern:*

Be it known that I, WALTER H. ALLEN, a citizen of the United States, residing at Akron, in the county of Summit and State of Ohio, have invented certain new and useful Improvements in Demountable Cushion-Tires, of which the following is a specification.

This invention relates to vehicle tires having a rubber body secured to a metal base which is transversely split in order to facilitate its attachment to and removal from the felly.

My invention aims principally to increase the durability of the tire by overcoming the tendency of the rubber to crack, if unsupported at the point where it spans the gap in the metal base or rim.

Figure 1 of the accompanying drawings represents a transverse section of a wheel felly carrying a tire of a type to which my invention is particularly applicable. Fig. 2 represents a longitudinal section showing a preferred embodiment of the invention. Fig. 3 represents a plan view of the adjacent ends of the split base or rim. Fig. 4 represents a side elevation of the bridge member.

10 is the felly, 11 the metallic tire-base or rim, and 12 the soft-rubber cushion tire body which, in accordance with well-known practice, I prefer to attach to the rim by means of a layer of hard rubber 13 vulcanized to the soft rubber and interlocked with longitudinal dove-tailed ribs 14 formed on the rim, but any other suitable form of anchorage may be employed.

15 is the metallic felly band on which the rim is seated. As a means for securing the tire to the felly I prefer to employ inward radial compression furnished by lateral wedging action, and to this end the rim is transversely split at one or more points as indicated at 16, and its side edges are formed with bevels 17 engaged by complementally beveled portions on a pair of detachable side rings 18 which are drawn against the rim and felly by means of transverse bolts 19. The rim preferably has only one gap 16, and normally springs open to a slightly larger diameter than that of the felly-band, so as to be readily slipped into and out of place when the clamping pressure of the rings is removed, but by drawing up on the bolts 19 when the tire is in place, the rim is contracted by the side wedging pressure and firmly clamped to its seat. This alternate slight contraction and expansion experienced by the rubber body when the tire is mounted and demounted, together with the inward compression of the rubber over the gap due to the normal use of the tire, will in time, if the rubber is unsupported at this point, develop a transverse crack in the rubber. To avoid that objection, I provide a bridge member, preferably of metal, so shaped as to allow for the slight approach and recession of the ends of the rim, and adapted to support the rubber across the gap 16. Said bridge-member is represented at 20, and in this instance is made of stout wire cloth in order to interlock with the rubber. In cross-section it is bent into the form of a circular loop, and has flaring margins 21 rooted in slanting grooves 22 which are formed in the rim 11 alongside of the gap 16. The ends of the ribs 14 terminate a short distance away from this bridge member. The hard rubber embedded in the meshes of the member 20 is, for the sake of clearness of illustration, shown only in outline in Fig. 2. It will be evident that the bridge 20, by supporting the rubber in an arch over the gap 16, and yielding to the relative movements of the ends of the rim 11, overcomes all tendency of the rubber tire body to crack at this point.

I claim:

1. In combination a transversely-split metal rim, a rubber tire body attached thereto, and a flexible bridge spanning the gap in the rim and supporting the rubber body across said gap.

2. In combination a transversely-split metal rim, a rubber cushion-tire body permanently attached thereto, and a flexible arched metal bridge spanning the gap in said rim and having its margins secured to the ends of the latter.

3. In combination a transversely-split metal rim, a solid rubber tire body vulcanized thereon, and a flexible, perforate, arched metal bridge embedded in the inner surface portion of said body and having its edges secured to the rim on opposite sides of the gap in the latter.

4. In combination a transversely-split rim, a solid rubber tire body vulcanized thereon, and a flexible, arched, wire-mesh bridge embedded in said body and connecting the ends of the rim across the gap therein.

5. The combination, with the wheel felly, of a transversely-split metal rim mounted thereon and having beveled side edges, side clamping plates for exerting inward wedging pressure on the beveled edges of said rim to contract the latter on the felly, a solid rubber tire body vulcanized to said rim, and a flexible bridge connecting the adjacent ends of said rim and supporting the rubber body across the gap in the rim.

In testimony whereof I have hereunto set my hand in the presence of two subscribing witnesses, this thirtieth day of January, 1914.

WALTER H. ALLEN.

Witnesses:
  T. F. OWEN,
  CHAS. H. TRAIN.